July 19, 1960  H. TIETZE ET AL  2,945,555

FILTER MATERIAL SUPPORT

Original Filed Nov. 30, 1954

INVENTORS
Hermann Tietze
Gerhard Stampe

BY Bailey, Stephens & Huettig
ATTORNEYS

United States Patent Office 2,945,555
Patented July 19, 1960

2,945,555
FILTER MATERIAL SUPPORT

Hermann Tietze and Gerhard Stampe, Lubeck, Germany, assignors to Otto Heinrich Drager, Lubeck, Germany Original application Nov. 30, 1954, Ser. No. 472,082. Divided and this application Dec. 10, 1956, Ser. No. 630,427

2 Claims. (Cl. 183—49)

This invention relates to supports for filter material. This application is a division of our application Serial No. 472,082, filed Nov. 30, 1954, now abandoned, for "Filter Material Support."

Filters must be constructed so that the loose granular filter material cannot escape through the lower filter opening, while at the same time the opening and filter material must be such as to offer the least resistance to the passage of air. Generally, screens, grates, and the like, are used for the support, a layer of relatively coarse material being first placed on the support, and then layers of successively smaller granules are placed in the filter until finally the filter material itself can be applied without falling through the lower layers.

An object of this invention is to produce a support which offers little resistance to the passage of air, and which can support the filter material without using layers of coarse material. Another object of the invention is to improve upon the means for collecting filtered air from out of the filter. In general, these objects are obtained by forming a grate-like filter support, the grate bars having flanges at an inclination greater than the natural slope angle of the filter material. Consequently, the filter material can rest directly on the grate without passing therethrough. Air ducts are connected into the space beneath the support or at the sides of the support for removing the filtered air.

The means by which the objects of the invention are obtained are disclosed more fully with reference to the accompanying drawings, in which.

Figure 1:
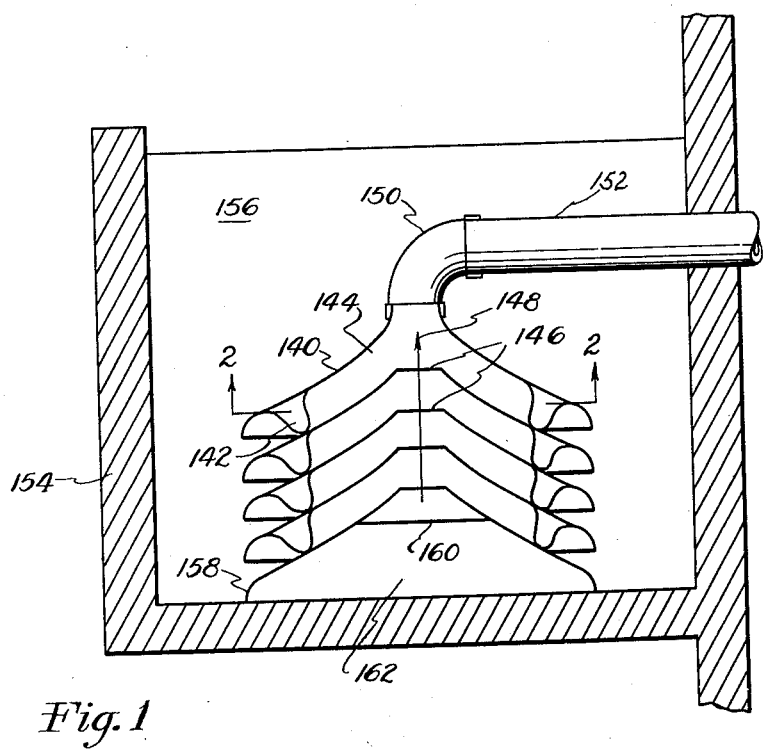
Figure 1 is a diagrammatical cross-sectional view through a filter.
Figure 2:
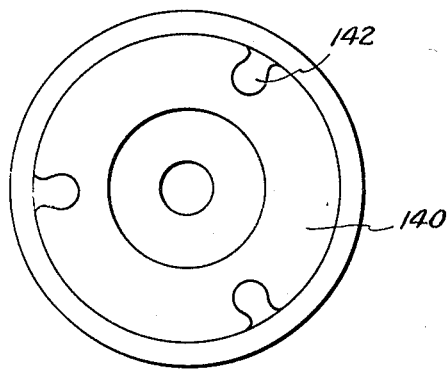
Figure 2 is a cross-sectional view taken on the line 2—2 of Figure 1.

As shown in Figures 1 and 2, the support is composed of a plurality of superimposed bell-shaped members 140, which are provided with downwardly turned flanges 142 which comprise legs for supporting the members 140, one above the other. Thus, conical spaces 144 are obtained between the members. The filter material is prevented from entering into the interior of the support. Members 140 are opened at their apexes 146 to provide an air outlet through which the air passes in the direction indicated by the arrow 148. By means of the connecting elbow 150 the air is led through the outlet duct 152. This support is contained in a chamber 154 and is filled with a filter material 156, such as sand.

The lowermost bell-shaped member 158 may be provided with a larger apex opening 160. It is also possible to close off the top of the filter support and have an outlet duct communicating with the space 162 in the lowermost member 158.

While in this embodiment bell-shaped members have been given as an example, these members may be in plan circular, oval, rectangular, or polygonal. In all the embodiments the supports may be constructed of sheet metal, but they may also be made of ceramic, clay, or burnt clay, or the like, to form partial resistance to corrosion which would be particularly suitable for sand filters used for air defense purposes.

Having now described the means by which the objects of the invention are obtained, we claim:

1. A filter material support comprising bell-shaped strips of material superimposed and having aligned apertured apexes forming a vertical air passageway entirely through said support, and leg means for spacing said strips from each other at a distance such that loose flowable solid filter material when poured over the support will settle at rest on the upper surface of a lower strip and extend upwardly to the lower edge of an adjacent upper strip at an angle with respect to the horizontal which is less than the natural slope angle of the filter material.

2. A filter material support as in claim 1, further comprising an air duct communicating with the apex aperture in the uppermost bell-shaped strip for conducting filtered air out from said support.

References Cited in the file of this patent

UNITED STATES PATENTS

| | | |
|---|---|---|
| 408,907 | Woodbury | Aug. 13, 1889 |
| 1,702,311 | Pantenburg | Feb. 19, 1929 |
| 1,858,329 | Hoersting | May 17, 1932 |
| 2,123,287 | Ney | July 12, 1938 |
| 2,493,356 | Mercier et al. | Jan. 3, 1950 |
| 2,703,936 | Hut | Mar. 15, 1955 |
| 2,759,274 | Jonsson | Aug. 21, 1956 |

FOREIGN PATENTS

| | | |
|---|---|---|
| 127,779 | Germany | Apr. 17, 1902 |
| 646,696 | Germany | June 19, 1937 |
| 864,309 | Germany | Jan. 22, 1953 |
| 914,125 | Germany | June 28, 1954 |
| 707,139 | France | Apr. 13, 1931 |
| 806,198 | France | Sept. 21, 1936 |
| 899,920 | France | Sept. 11, 1944 |